Figure 3:
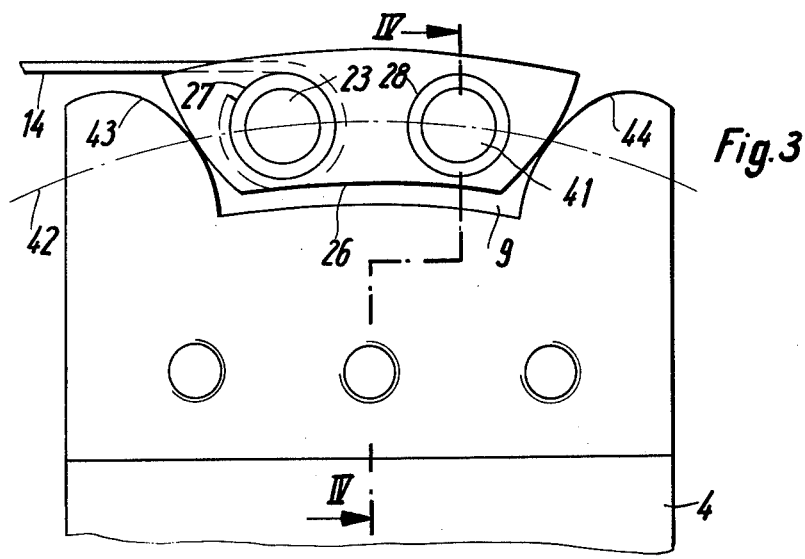

United States Patent [19]
Jende

[11] 3,934,712
[45] Jan. 27, 1976

[54] APRON CONVEYOR

[75] Inventor: Wilhelm Jende, Tostedt, Germany

[73] Assignee: Pilot Hydraulik GmbH, Germany

[22] Filed: Dec. 28, 1973

[21] Appl. No.: 429,198

[52] U.S. Cl. ............... 198/195; 74/245 C; 74/250 C
[51] Int. Cl.² ........................................... B65G 15/52
[58] Field of Search ........... 198/195, 196, 197, 189; 74/229, 243 C, 243 NC, 245 C, 250 C, 251 C

[56] References Cited
UNITED STATES PATENTS

| | | | |
|---|---|---|---|
| 1,940,832 | 12/1933 | Ambruson | 198/196 |
| 1,978,732 | 10/1934 | Yocum | 74/243 C |
| 2,045,957 | 6/1936 | Loose | 198/195 |
| 2,584,134 | 2/1952 | Knutson | 198/195 X |
| 2,678,569 | 5/1954 | Bremer | 74/251 R |
| 3,002,396 | 10/1961 | Worrall, Jr. | 74/229 |
| 3,016,757 | 1/1962 | Kornylak | 74/229 X |
| 3,026,737 | 3/1962 | Berg | 74/229 |
| 3,082,861 | 3/1963 | Kornylak | 198/195 |
| 3,090,479 | 5/1963 | Saylor | 198/189 |
| 3,245,517 | 4/1966 | Ward | 198/195 |
| 3,344,638 | 10/1967 | Diolot | 198/195 X |
| R11,206 | 12/1891 | Wells | 73/243 C |

FOREIGN PATENTS OR APPLICATIONS

| 14,932 | 6/1897 | United Kingdom | 74/243 NC |
|---|---|---|---|

Primary Examiner—Evon C. Blunk
Assistant Examiner—Richard K. Thomson
Attorney, Agent, or Firm—Toren, McGeady and Stanger

[57] ABSTRACT

Two reversing pulleys are spaced apart transversely to their axes. At least one of said pulleys is a drive pulley. Each of said pulleys comprises first and second axially spaced discs, each of which is formed with radially outwardly open recesses, which are angularly spaced and are defined each by side faces which are convexly curved like sides of gear teeth. A series of slats of predetermined length extends along an endless path of travel between and around said reversing pulleys. First and second sets of connective members are respectively aligned with said first and second discs along said path of travel and disposed on opposite sides of said series of slats. A plurality of pins are mounted on said slats on opposite sides thereof at each end edge portion of each slat and in adjacent ones of said connecting members. Each of said pins is rotatable in at least one of said parts consisting of the slat and the connecting member in which said pin is mounted, so that mutually adjacent slats are articulatedly connected. Each of said connecting members has side faces which are convexly curved like sides of gear teeth. These faces establish rolling contact with those of the recesses in the pulleys.

9 Claims, 5 Drawing Figures

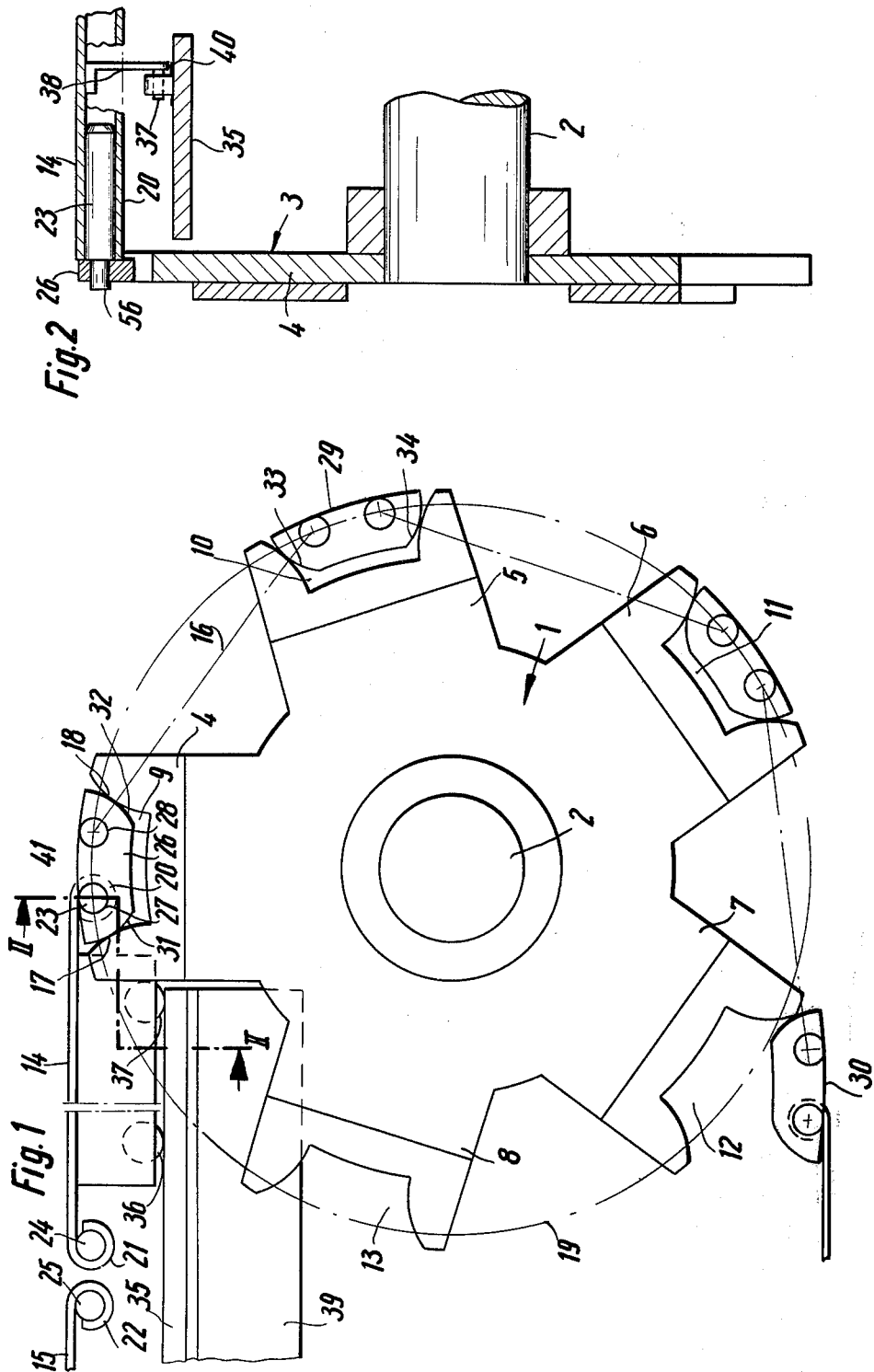

APRON CONVEYOR

This invention relates to an apron conveyor, which comprises a series of slats, which are arranged one behind the other in the path of travel and are hingedly connected and adapted to be driven by reversing pulleys, which have spider arms, which at their outer end have a recess for receiving a connecting member, which connects adjacent slats, and are angularly spaced so that the secant between the profiles of adjacent arms is equal to one slat length.

Such apron conveyors are used as assembly line conveyors and for carrying commodities between machines and the like. It is known to provide the slats of the apron conveyor with rollers, which face away from the outside and engage backing rails disposed between the reversing pulleys.

Such apron conveyors are usually provided with two roller chains, which serve to move the slats and are trained around reversing sprockets and provided with brackets which carry the slats. This structure is relatively expensive because separate conveyor chains are required, the links of which must be provided with the brackets, and the load is not transmitted to the chains directly by the slats but is transmitted through the brackets carried by the roller chains. For this reason, the conveyors of that type have a relatively small load-carrying capacity, and special provisions are required to prevent a jamming at the points of reversal.

Particularly in conjunction with engagement-backing and/or drive pulleys which have spider arms it is also known to provide part-elliptical connecting members, which are guided in peripherally open recesses in such arms and hold angled adjacent end portions of slats together. The disadvantages of that arrangement reside in that there is a considerable friction between the connecting members and the associated recesses during the reversal and that adjacent slats are connected by resilient joints, which are expanded during operation under load. The angled slat end portions are subjected to a bending stress, which results in an increase of the angle between the body of the slat and the angled end portion. At the bend, this gives rise to stresses, particularly to repeated alternating stresses, which result in a fatigue and eventually in a fracture of the material. Even in normal operation when the conveyor is still operative, the distance between the load-carrying surfaces of adjacent slats may be of an order of several millimeters to one centimeter. Dirt may enter the connecting member so that the function of the conveyor is even more adversely affected. The lost motion which is present under load is particularly undesirable where these known connecting members are used because the angled edge portions of the slats as well as the connecting rails, which are part-elliptical in cross-section, can bend outwardly or resiliently yield in an outward direction so that the slats are jammed in the recesses of the arms.

It is also known to provide an apron conveyor having an endless series of slats which is trained around two reversing pulleys, at least one of which is spring-loaded to tension the series of slats. In such conveyor, the series of slats will yield to an extent which depends on the weight of the load carried by it and on its speed of travel so that the charging of items differing in weight onto the conveyor results in vibration which in the known conveyors inevitably gives rise to jamming or friction so that the operation is adversely affected.

It is an object of the invention to provide an apron conveyor of the kind stated first hereinbefore which under its conditions of operation ensures a reversal of the slats substantially without friction, particularly on drive pulleys, even when articles differing in weight are charged onto the conveyor, and without an occurrence of jamming or vibration, and in which, specifically, the slats are joined without need for chainlike elements moving in unison with the slats, and which can be driven without an overloading of the connecting members even under a heavy load.

This object is accomplished according to the invention in that each slat is provided on both sides with pins at both end edges of the slats, the two pins on adjacent end edges of adjacent slats on each side of the series of slats are mounted in a segment-shaped connecting member and are rotatable relative to the slat and/or the connecting member, said connecting members are provided on both sides of the series of slats, the reversing pulleys have end discs, which are associated with the connecting members and formed with said recesses, which are defined by wall portions and engageable with wall portions of the connecting members, and said wall portions of said outer discs and of said connecting members extend generally at right angles to the path of travel and are convexly curved toward each other like the sides of gear teeth.

This design results surprisingly in a rolling contact as between meshing gears so that a non-frictional movement of the connecting members into and out of the recesses of the reversing pulleys is enabled even when a driving torque is exerted. It is emphasized that the pins can be firmly mounted on curled-in portions of the slats and these curled-in portions will not be expanded under driving stresses. As a result, a predetermined spacing of the slats will be reliably maintained and adjacent slats can be angled relative to each other without a deformation of the connecting members.

Whereas the pins might be arranged under the slats, a particularly preferred embodiment of the invention comprises slats which have end edge portions which at least at their outer ends are curled to receive the pins, which with their end portions protruding over the side edge of the slats are mounted in the connecting members. This results in a relatively simple design, in which adjacent slat edge portions can be curled in throughout their width.

The contacting wall portions of the connecting members and of the reversing pulleys are preferably designed like teeth of involute gears, particularly of gears having a pressure angle of 20°. In accordance with remarks made in the introductory part of this specification, other profiles may be used too but the use of involute gear teeth has the advantage that they can be formed with simple teeth and can even take up changes of the distance between the axes without periodic deviations. Another particularly desirable improvement resides in that the profile of the wall portions is flared by a decrease in radius outside of the pitch circle. This design enables the provision of apron conveyors which advantageously have particularly small dimensions. A special feature resides in that, e.g., slats having in the direction of travel a length of about 13.5 centimeters are combined with reversing pulleys which have an effective diameter of an order of 25 centimeters and in which the width of the profiled recess, measured in the pitch circle, is about 20°.

In connection with the flaring mentioned above, a flaring profile in accordance with an arc of a circle is preferred. This will particularly enable the use of smaller reversing pulleys as mentioned above.

According to another preferred feature the connecting members consist of sections which extend in the longitudinal direction of the conveyor and which are arranged one beside the other transversely to the direction of travel, and the apertures in the connecting member is provided with bearing bushings. According to a further feature the connecting members consist of sintered metal.

Figure 4:
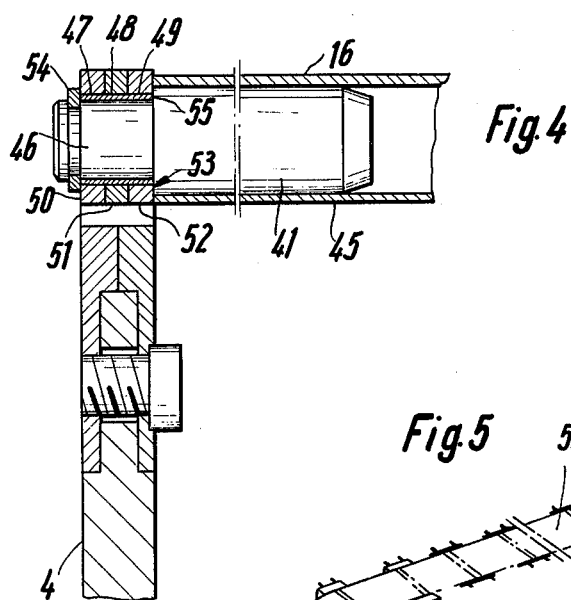
Figure 5:
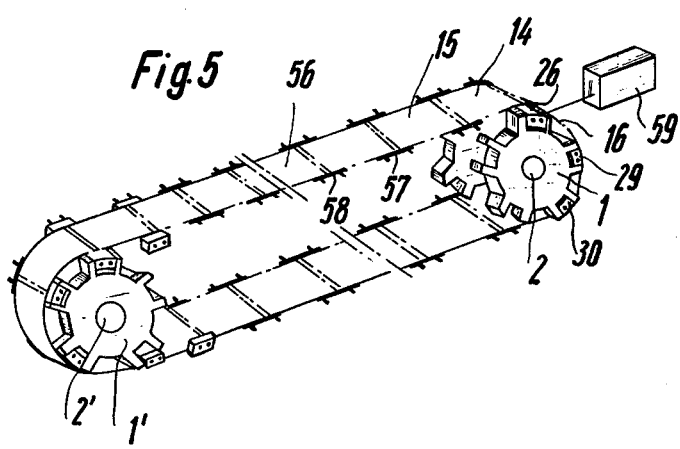

The invention will be described hereinafter with reference to two embodiments, which are shown diagrammatically and by way of example in the drawings, in which FIG. 1 is a fragmentary side elevation showing one end of a portion of a series of slats in conjunction with a reversing pulley of a first embodiment, FIG. 2 is partly an end view of the arrangement of FIG. 1 and in its upper part is a sectional view taken on line II—II of FIG. 1, FIG. 3 is a view which corresponds to part of FIG. 1 and diagrammatically illustrates a second embodiment, FIG. 4 is a sectional view taken on line IV—IV in FIG. 3, and FIG. 5 is a side elevation showing an apron conveyor having details which will be described with reference to FIGS. 1 to 4.

FIG. 5 shows diagrammatically two reversing pulleys 1, 1', which are mounted on shafts 2, 2' and around which a series of slats 60 is trained by special means which will be described hereinafter. This series of slats comprises, e.g., the slats 14, 15, 16, which are connected by special connecting members, some of which are designated 26, 29, 30. Additional connecting members are diagrammatically indicated at 57, 58. The shaft 2 is driven by a motor 59.

FIGS. 1 and 2 show the reversing pulley 1, which is non-rotatably connected to the shaft 2. The reversing pulley comprises two discs, which are mounted on the ends of the shaft 2. One of said discs is designated 3 in FIG. 2. Each of these discs forms a spider having spider arms 4 to 8. These arms are provided at the end of the reversing pulley and at their outer ends are formed with recesses 9 to 13. The angular spacing of the arms depends on the length of the slats 14, 15 of the apron conveyor. These slats are closely spaced and hingedly connected. In FIG. 1, the slats 14, 15 are shown in alignment, and the next slat 16 which precedes in the direction of travel extends along a secant between the arms 4 and 5.

The recesses 9 to 13 shown in FIGS. 1 and 2 have inwardly facing sides 17, 18, which are shaped like involute gear teeth having a pitch circle 19.

At their adjacent edges, the slats 14 to 16 have curled-in portions 20, 21, 22, which extend throughout the width of the slats and have outer end portions in which pins 23, 24, 25 are non-rotatably mounted. Each of these pins has an end portion 56, which may be stepped down and which protrudes outwardly and on which at least a part of the connecting member 26 is rotatably mounted. Such connecting member has two bores 27, 28 and the outwardly protruding end portions of the pins of two adjacent slats are rotatably mounted in said bores. Connecting members 29, 30, . . . are similar to the connecting member 26 and connect adjacent slats. Various connecting members are shown in rolling contact with the recesses 9 to 12. Those sides 31, 32 and 33, 34 of the connecting members which are spaced along the path of travel of the apron conveyor are curved just as the sides 17, 18 like teeth of involute gears so that a rolling contact is enabled even in case of an inclination during a hunting motion. It should be taken into account that when a driving force is applied to the reversing pulley 1, the connecting member 26 can yield by assuming an inclined position in that its side 31 ascends and its side 32 descends in FIG. 1. With respect to the shaft 2, the height of the connecting member 26 below the pitch circle 19 is less than the depth of the recess 9.

It is apparent from FIGS. 1 and 2, that backing rails 35 are disposed along the path of travel between adjacent reversing pulleys, and backing rollers 36, 37 are mounted on the slats 14, 15, 16 and run on said rails. The backing roller 37 is shown also in FIG. 2. It is rotatably mounted on a bracket 38, which is secured to the underside of the slat 14.

The backing rails 35 are mounted on a frame 39, which extends as far as to the reversing pulleys. Adjacent to the latter, the slats are supported only by the engagement of the connecting members 26, 29, 30 in the recesses 9 to 13.

Due to the provision of the backing rollers 37 on the lateral brackets 38, the returning lower course of the series of slats may also be supported by rails which engage the backing rollers from below so that a sag is prevented. These rails are not shown.

FIG. 3 shows the pin 23 and a pin 41 in the slat 16, which is adjacent to the slat 14. These pins shown in FIG. 1 are rotatably mounted in bores 27, 28 of the connecting member 26. According to FIG. 3 the connecting member is designed as described with reference to FIG. 1 but the sides of the recess 9 differ from those shown in FIG. 1 because they are shaped like involute gear teeth only inwardly of the pitch circle 42 whereas outwardly of the pitch circle the recesses flare, e.g., in accordance with arcs of a circle 43, 44 so that the movement of the connecting members into and out of the recesses is facilitated.

According to FIG. 4, the pin is non-rotatably mounted in the curled-in portion 45 and has a stepped-down outer end portion 46, which extends through the bores 47, 48, 49 of three sections 50, 51, 52 of the connecting member, which is generally designated 53. The three sections 50, 51, 52 are aligned in a direction which is transverse to the longitudinal direction of the apron conveyor and are held together by a circlip 54 at the extreme end of the stepped-down end portion 46. The bores 47 to 49 may be lined with a bearing bushing 55. It is preferred, however, to use sections 50 to 52 which like the connecting members as such consist of a low-friction material, particularly sintered metal.

What is claimed is:

1. A conveyor assembly comprising:
   a pair of pulleys each rotatable about an axis and spaced apart with their axes generally parallel to define an endless path of travel extending between said pulleys and about their peripheries, with a pitch circle being defined about each of said pulleys having a center which is coincident with the axis of rotation of each pulley, respectively;
   a plurality of recess means defined about the periphery of each of said pulleys, each of said recess means being defined between at least a pair of circumferentially spaced curved convex terminal side walls extending generally parallel to said pulley axes with a widening configuration opening radially outwardly of said pulleys;

said terminal side walls of said recess means including a portion thereof extending radially outwardly of said pitch circle and a portion extending radially inwardly therof, said radially outwardly extending portion having a radius of curvature which is smaller than the radius of curvature of said radially inwardly extending portion;

a plurality of slats each having a pair of ends and a predetermined length extending therebetween;

a plurality of connecting means each joined between the ends of adjacent slats to form said slats in an endless assembly extending in a direction lengthwise of said slats along said endless path of travel between said pair of pulleys;

said connecting means including means enabling relative pivotal motion between each of said connecting means and each of said slats joined thereto about a pivot axis extending generally parallel to said axes of said pulleys;

means defining on each of said connecting means at least a pair of opposed convex walls adapted to be engaged within each of said recess means between terminal side walls thereof, said opposed convex walls being spaced apart in the direction of said endless path of travel a distance commensurate with spacing between said terminal side walls to enable each pair of said opposed convex walls to be engaged with rolling contact in succession between pairs of said terminal side walls during rotation of said pulleys;

each of said recess means being spaced apart circumferentially about said pulleys a distance determined by said predetermined length of said slats to enable said connecting members to become engaged in succession within said recess means to drive said endless slat assembly through said endless path of travel upon rotation of said pulleys;

said terminal side walls of said recess means and said opposed convex walls of said connecting means being configured to form said pulleys and said connecting means essentially as intermeshing gearing members.

2. An assembly according to claim 1 wherein each of said pulleys is formed with a pair of discs spaced apart axially upon the axis of rotation of said pulley, each of said recess means being formed by a pair of recesses located on the periphery of each of said discs, said pair of recesses being aligned axially of said pulley, and wherein each of said connecting means comprise a pair of connecting members located on opposite sides of said slats each adapted to be engaged, respectively, with one of said recesses of said aligned pair of recesses.

3. An assembly according to claim 2 wherein said connecting means include a plurality of pins, each of said ends of said slats having one of said pins attached thereto, said pins extending in a direction parallel to the axes of said pulleys beyond said slats and into pivoted engagement with a pair of said connecting members on opposite sides of said slats, each of said pair of connecting members extending between adjacent ends of a pair of slats with each pair of connecting members having a pair of said pins in engagement therewith.

4. An assembly according to claim 1 wherein each of said radially outwardly extending portions have a curvature corresponding to the arc of a circle.

5. An assembly according to claim 1 wherein said predetermined length of said slats is about 13.5 cm and wherein each of said pulleys comprises an effective diameter of about 25 cm.

6. An assembly according to claim 1, wherein each of said terminal side walls of said recess means are spaced apart a distance corresponding to an angle of about 20° bounded by a pair of radial lines both extending from the axis of the pulley upon which said recess means are formed.

7. An assembly according to claim 1 wherein said terminal side walls of said recess means and said opposed convex walls of said connecting means are formed in the shape of teeth of involute gears having a pressure angle of about 20°.

8. An assembly according to claim 3 including bushing means interposed between each of said pins and each of said connecting members.

9. An assembly according to claim 3 wherein each of said connecting members is formed of sintered metal.

* * * * *